United States Patent
Simonov et al.

(10) Patent No.: US 10,586,076 B2
(45) Date of Patent: Mar. 10, 2020

(54) SYSTEM AND METHOD FOR CONTROLLING ACCESS TO OS RESOURCES

(71) Applicant: Acronis International GmbH, Schaffhausen (CH)

(72) Inventors: Vladimir Simonov, Moscow (RU); Stanislav Protasov, Moscow (RU); Serguei M. Beloussov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 183 days.

(21) Appl. No.: 15/245,410

(22) Filed: Aug. 24, 2016

(65) Prior Publication Data

US 2017/0061160 A1   Mar. 2, 2017

Related U.S. Application Data

(60) Provisional application No. 62/208,972, filed on Aug. 24, 2015.

(51) Int. Cl.
*G06F 21/62* (2013.01)
*H04L 29/06* (2006.01)

(52) U.S. Cl.
CPC ...... *G06F 21/6281* (2013.01); *G06F 21/6209* (2013.01); *H04L 63/1441* (2013.01)

(58) Field of Classification Search
CPC ............. G06F 21/6281; G06F 21/6209; H04L 63/1441
See application file for complete search history.

(56) References Cited

U.S. PATENT DOCUMENTS

| | | | | |
|---|---|---|---|---|
| 4,984,272 A * | 1/1991 | McIlroy | | G06F 21/6218 713/165 |
| 2002/0099837 A1* | 7/2002 | Oe | | G06F 9/468 709/229 |
| 2004/0221294 A1* | 11/2004 | Kalmuk | | G06F 9/544 719/312 |
| 2005/0223239 A1* | 10/2005 | Dotan | | G06F 21/52 713/188 |
| 2007/0130621 A1* | 6/2007 | Marinescu | | G06F 21/52 726/22 |
| 2007/0277242 A1* | 11/2007 | Baker | | G06F 21/554 726/25 |
| 2010/0269120 A1* | 10/2010 | Manttari | | G06F 9/468 719/313 |
| 2015/0089515 A1* | 3/2015 | Bondada | | G06F 9/44505 719/327 |
| 2015/0347107 A1* | 12/2015 | Munshi | | G06F 8/47 717/147 |
| 2016/0092691 A1* | 3/2016 | Thom | | G06F 21/6218 726/1 |

* cited by examiner

*Primary Examiner* — Cheng-Feng Huang
(74) *Attorney, Agent, or Firm* — Arent Fox LLP; Michael Fainberg

(57) ABSTRACT

Disclosed are systems, methods and computer program products for controlling access to operating system (OS) resources. An exemplary method includes: creating an OS resource associated with a first program; assigning a unique label to the first program; associating the unique label with the OS resource; and configuring a resource descriptor of the OS resource to allow access to the OS resource to processes having the same unique label as the first program, and to deny access to the OS resource to processes having a different label.

15 Claims, 6 Drawing Sheets

SYSTEM AND METHOD FOR CONTROLLING ACCESS TO OS RESOURCES

CROSS-REFERENCE TO RELATED APPLICATIONS

This application claims priority to U.S. Patent Provisional Application Ser. No. 62/208,972, filed Aug. 24, 2015, the entire contents of which being incorporated herein by reference into the present application.

TECHNICAL FIELD

The disclosure relates generally to the field of computer science, and more specifically to systems and methods for controlling access to operating system resources.

BACKGROUND

When executed on a computer, a program (also referred herein as a "resource owner") creates one or more operating system (OS) resources and needs to restrict access to these resources from other programs. Typically, such restriction is required to have full control over the resource lifetime.

However, other programs may gain access to the OS resource without permission and unbeknownst to the resource owner. This problem is illustrated by FIG. 1, which shows an exemplary configuration of a computer system with uncontrolled access to OS resources. As shown by this illustration, a program may create a system resource (step 101) and launch an OS utility to handle the resource data (steps 102-104). When operation of the OS utility is finished, the resource is released, and control is passed back to the program. The program then destroys the resource (step 105). If some other program (e.g., a system monitor daemon) starts to work with the resource (step 106), the program call to destroy the resource (step 105) may never complete because the resource will be considered as "busy," so that the resource may still remain available after the program terminates.

A typical solution for such problem is to configure system monitor daemons to avoid access to the resource(s). However, this is often very difficult because of differences in the configuration of the wide range of system monitor programs that may be installed and running on a given system. Moreover, this pre-configuration approach may not be an option, or may be impossible to implement effectively if one or more system monitor programs are installed after the installation of the resource owner. In view of these shortcomings, there is a need in the art for a more effective mechanism for controlling access to system resources.

SUMMARY OF THE DISCLOSURE

The present disclosure provides, in some aspects, systems, methods and computer program products for controlling access to OS resources. In one exemplary aspect, control over access to OS resources may be accomplished using dynamic process labeling. In some aspects, process groups may be used as an access control parameter for operating system resources.

According to some aspects of the disclosure, a method for controlling access to OS resources includes: creating an OS resource associated with a first program; assigning a unique label to the first program; associating the unique label with the OS resource; and configuring a resource descriptor of the OS resource to allow access to the OS resource to processes having the same unique label as the first program, and to deny access to the OS resource to processes having different labels.

In alternative aspects, this general method may further include a step of: assigning the same unique label to one or more child processes of other programs launched by the first program.

In still further aspects, this method may include the steps of: receiving, from a process, a system call to access the OS resource; identifying, by the hardware processor, a unique label of the process; checking, by the hardware processor, in the resource descriptor whether the unique label of the process matches the unique label associated with the OS resource; when the unique label of the process matches the unique label associated with the OS resource, allowing the process to access to the OS resource; and when the unique label of the process does not match the unique label associated with the OS resource, denying the process access to the OS resource.

In a first general aspect, the present disclosure provides a method for controlling access to operating system (OS) resources, the method including: creating, by a hardware processor, an OS resource associated with a first program; assigning, by the hardware processor, a unique label to the first program; associating, by the hardware processor, the unique label with the OS resource; and configuring, by the hardware processor, a resource descriptor of the OS resource to allow access to the OS resource to processes having the same unique label as the first program, and to deny access to the OS resource to processes having a different label.

In an alternative aspect, the method further includes: assigning, by the hardware processor, the same unique label to one or more child processes of the first program and/or other programs launched by the first program.

In an alternative aspect, the method further includes: receiving, from a process, a system call to access the OS resource; identifying, by the hardware processor, a unique label of the process; and checking, by the hardware processor, in the resource descriptor of the OS resource, whether the unique label of the process matches the unique label associated with the OS resource. In a further aspect, following the checking step, the method further includes: when the unique label of the process matches the unique label associated with the OS resource, allowing the process to access the OS resource; and when the unique label of the process does not match the unique label associated with the OS resource, denying the process access to the OS resource.

In an alternative aspect, the unique label is a process group identifier.

In an alternative aspect, the resource descriptor is an open( ) function.

In an alternative aspect, access to the OS resource includes at least one of reading, writing, or destroying the OS resource.

In a second general aspect of the disclosure, a system for controlling access to OS resources is disclosed, the system including a processor configured to perform the steps of any of the methods disclosed herein.

In third general aspect of the disclosure, a computer program product embedded in a non-transitory computer-readable storage medium is disclosed, the computer-readable storage medium comprising computer-executable instructions for controlling access to OS resources, the medium including instructions for performing the steps of any of the methods disclosed herein.

This simplified summary of exemplary aspects of the disclosure serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Figure 1:
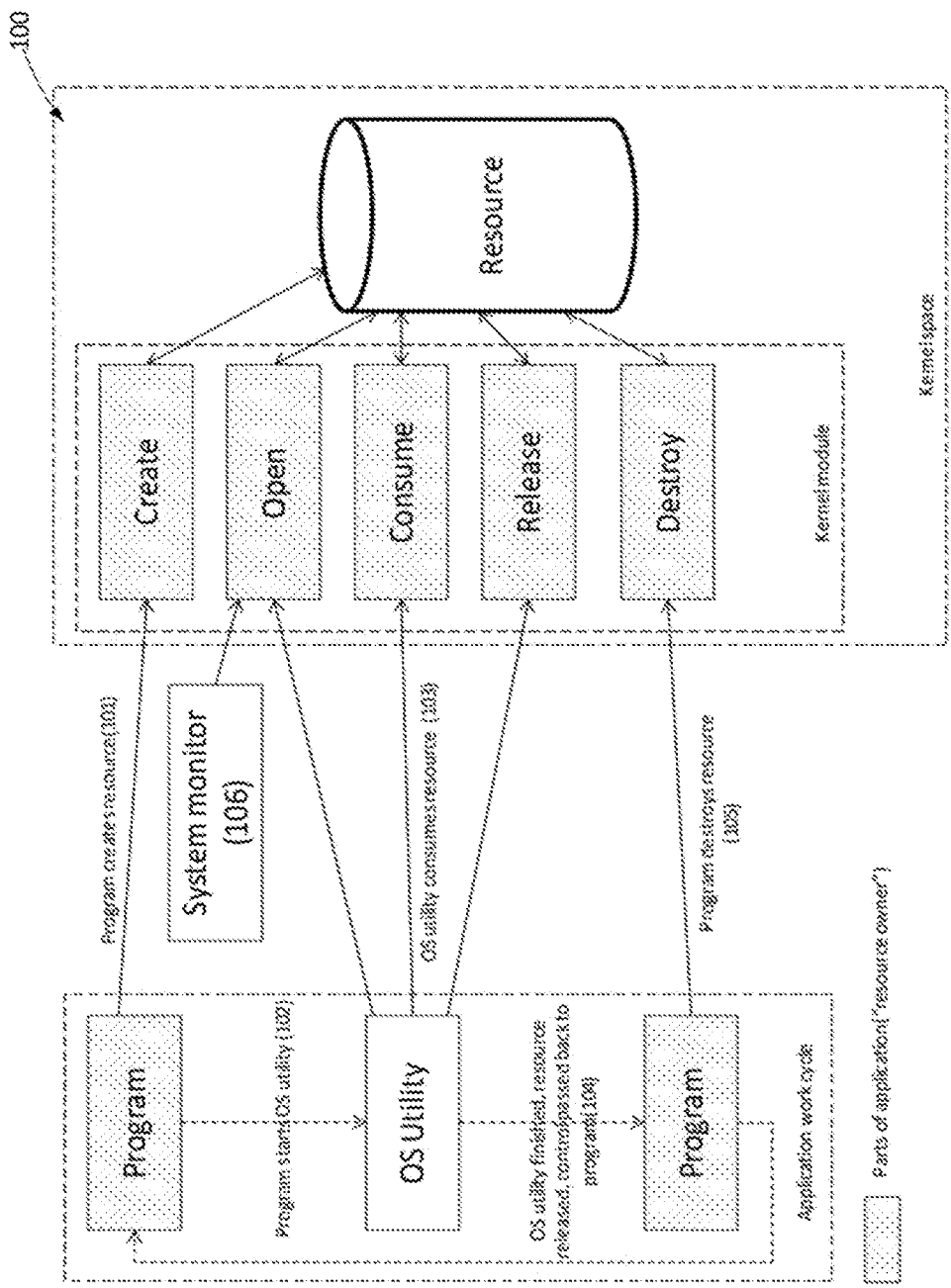
FIG. 1 is a diagram illustrating an exemplary configuration of a computer system with uncontrolled access to OS resources.

Exemplary aspects of the present disclosure are described herein in the context of systems, methods, and computer program products for controlling access to operating system resources. Those of ordinary skill in the art will understand that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying drawings. The same reference indicators will be used to the extent possible throughout the drawings and the following description to refer to the same items.

In one general aspect, dynamic process labeling may be used to identify programs involved in an application work cycle. When an application is launched on a computer (which will be referred herein as a "first program"), the OS, such as Windows®, Unix®, or Linux®, may assign a unique label (e.g., a unique integer number) to all processes and threads of the first program. For example, in Unix® and Linux®, a process group identifier may be used as a unique label. Also, when the first program launches another program (which will be referred to herein as a "second program"), such as an OS utility or web browser, the operating system may assign the same unique label as that of the first program to the child processes and child threads of the second program launched by the first program. The use of the same label for the processes of the first program and any child processes or threads of the second program launched by the first program allows the OS to differentiate between programs involved in the work cycle of the first program (e.g., processes of the second program launched by the first program) and other processes of the second program launched by other applications on the computer.

In another exemplary aspect, dynamic process labeling may be used to control access to one or more system resources of the first program, such as files opened by the first program (e.g. file handlers), network connections opened by the first program (e.g., network sockets), and memory areas (e.g., virtual memory) and storage space (e.g., block-level storage devices) used by the first program. In some implementations, a process label should have at a minimum the following properties in order to be used as an access control parameter: the label should be unique over the computer system; the OS should be allowed to generate and to set new labels for current processes; and the label should be inherited by all child processes. For example, process group identifiers of both the Unix® OS and Linux® OS have these properties. In some aspects, in order to use a process label as an access control parameter to a system resource, when a first program (i.e., a resource owner) creates a system resource, the process label for the first program may be saved in a resource descriptor associated with the created resource. In further aspects, the resource descriptor should be configured to allow access to the resource only to processes that have the same label as that of the resource owner (i.e., the first program in the scenario described above). An example of a resource descriptor may be an open( ) function used by processes to make OS system calls requesting access the system resources, as implemented by most modern operating systems.

As an example of a general method or system implementing dynamic process labeling, consider the following scenario. When a user launches a web browser application, the OS of the computer on which the web browser is running may assign a unique label to the main process of the web browser application. The user then tries to open a URL of a PDF file using the web browser. The web browser downloads the PDF file and stores it in its cache in a random access memory of the computer or in a download folder on a hard disk drive of the computer. In this scenario, the PDF file is a resource, and the web browser is a resource owner. The web browser may save its unique label in a resource description of the PDF file. In order to display the PDF file, the web browser application may launch a PDF viewer plug-in, such as Adobe® Acrobat® Reader® plug-in. The child process of the Adobe® Acrobat® Reader® launched by the web browser application may then be assigned the same unique label as the main process of the web browser application that downloaded the PDF file (i.e., the resource owner). The web browser application may also configure a resource descriptor of the PDF file to include therein code allowing access to the resource only to processes having the same unique label as the main process of the web browser application, and blocking access to the OS resource to all other processes. Therefore, the PDF file will be accessible to the child process of the Adobe® Acrobat® Reader® plug-in launched by the web browser application, but inaccessible to all other programs, such as system monitor programs. In this manner, when the user is finished viewing the PDF file, the web browser application may destroy the OS resource associated with the PDF file, without concern that some other process may be still accessing the OS resource.

Figure 2:
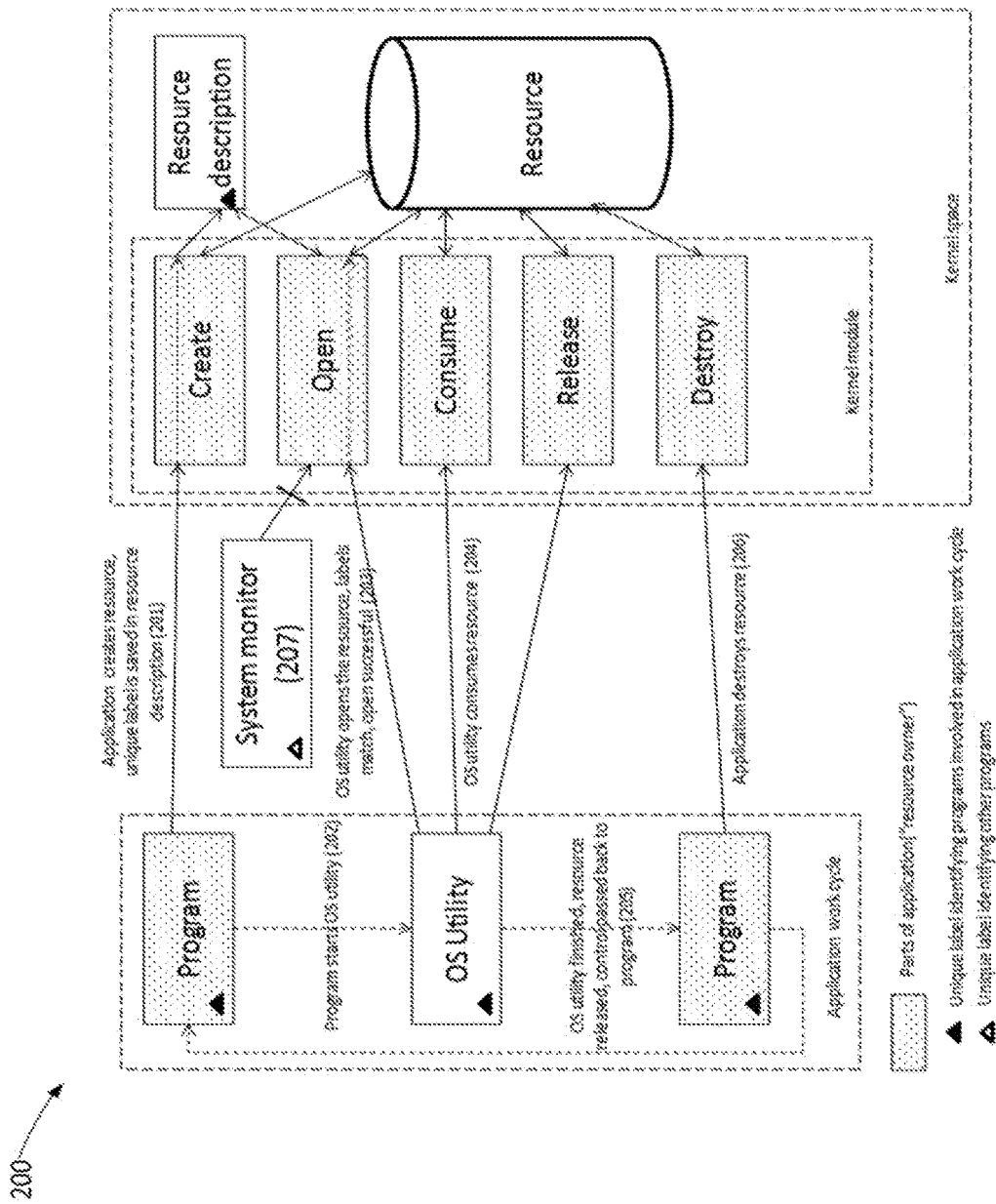
FIG. 2 is a diagram illustrating general aspects of a system and method for controlling access to OS resources using dynamic process labeling.

FIG. 2 illustrates an exemplary system and method for controlling access to OS resources using dynamic process labeling. As shown by this example, when an application creates a resource, a unique label may be saved in a resource descriptor (step 201). Programs involved in the application work cycle are assigned the same label (step not shown). A module providing access to the resource compares the requestor's label with the label saved in the resource descriptor associated with the application. Access to the resource is then permitted if the labels match (step 203), but denied if the labels do not match (step 207). In this sense, the process label performs a gatekeeping role preventing other programs unassociated with the original application from accessing the resource and potentially preventing the resource from being destroyed by the original application, e.g., when the original application is closed or terminated.

Figure 3:
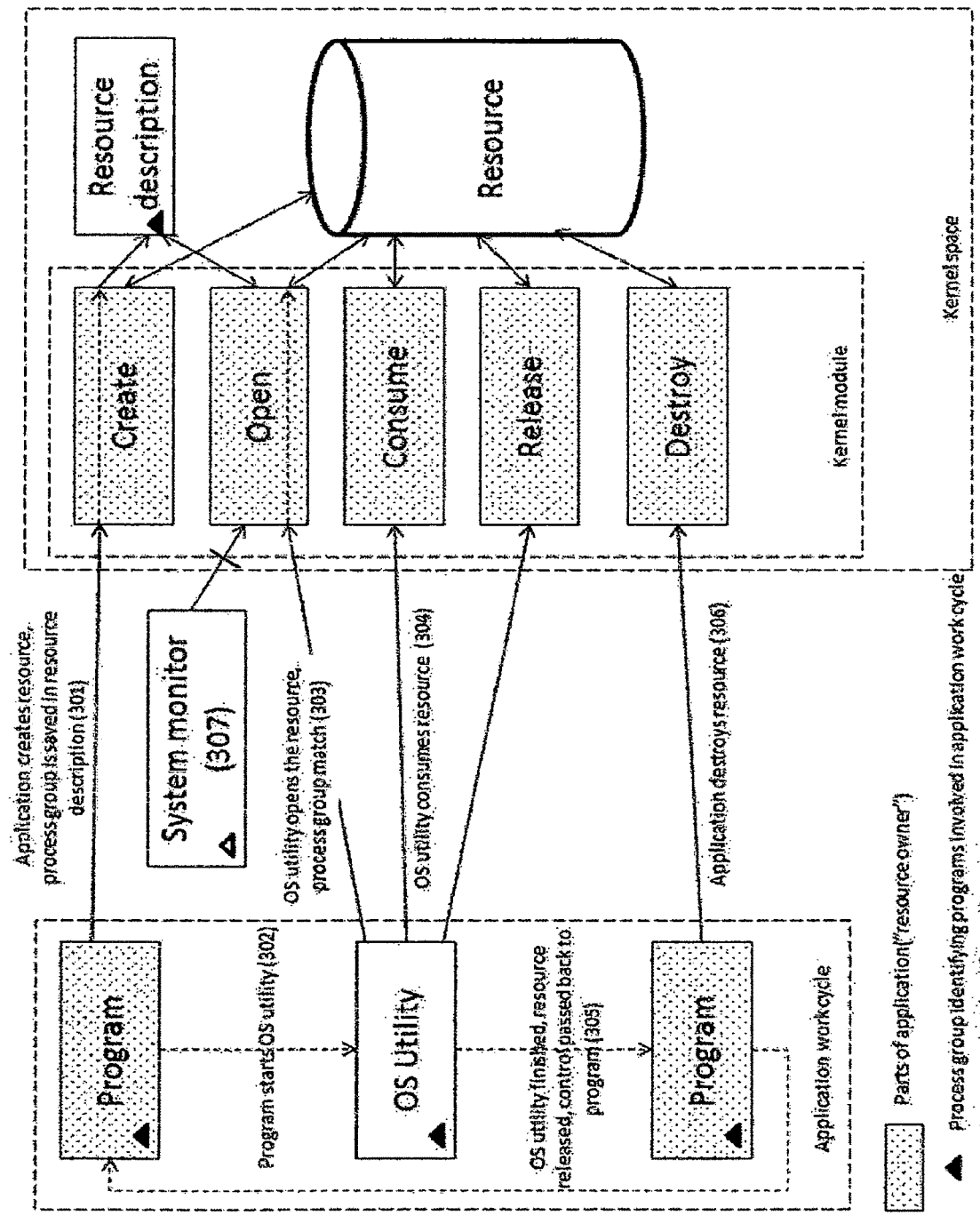
FIG. 3 is a diagram illustrating general aspects of a system and method for controlling access to OS resources using process groups.

FIG. 3 illustrates an exemplary system and method for controlling access to OS resources using a process group as an access control parameter. When an application creates a resource, a process group identifier may be saved in a resource descriptor (step 301). Programs involved in the application work cycle may be assigned the same process group identifier (step not shown). A module providing access to the resource may be configured to compare a requestor's label with the label saved in the resource descriptor associated with the resource. Access to the resource may then be allowed if the labels match (step 303), and denied if the labels do not match (step 307).

An exemplary resource descriptor (in this case, by an open function) that uses process groups as an access control parameter to control access to an operating system resource is provided below:

```
static int snumbd_open_blk(struct block_device *bdev, fmode_t mode)
{
    int users;
    pid_t pgrp;
    struct session_struct *s = bdev->bd_disk->private_data;
    if (!s)
        return -ENOTTY;
    pgrp = sn_current_pgrp( );
        if (pgrp != s->s_apgrp) {
            sa_info("Disable access (%d,%d)...\n", pgrp, s->s_apgrp);
            return -EACCES;
        }
    users = atomic_read(&s->s_users);
    sa_debug(DEBUG_API, "s=%p dev=%x users=%d\n", s,
    s->s_kdev, users);
    atomic_inc(&s->s_users);
    if (users < 3) {
        bd_set_size(bdev, s->s_scount << 9);
        set_blocksize(bdev, 512);
        set_device_ro(bdev, (s->s_ro != 0));
    }
    return 0;
}
```

The exemplary source code below illustrates a process for assigning a label (i.e., a process group identifier) to a newly created OS resource:

```
static int session_init(struct session_struct * s, unsigned long long size,
int ro)
{
    int ret;
    int minor;
    sa_debug(DEBUG_API, "len=%llu.\n", size);
    ret = -EINVAL;
    down(&s->s_sem);
    if (s->s_state != SNUM_NOTINITED)
```

-continued

```
        goto out;
.............
    s->s_apgrp = process_group(current);
    sa_kdebug("OK. kdev=%x:%x, len=%llu s=%p pgrp=%d.\n",
        MAJOR(s->s_kdev), MINOR(s->s_kdev), s->s_scount,
        s, s->s_apgrp);
    s->s_hpid = current->pid;
    set_mb(s->s_state, SNUM_INITED);
.............
    up(&s->s_sem);
    return ret;
}
```

Figure 4:
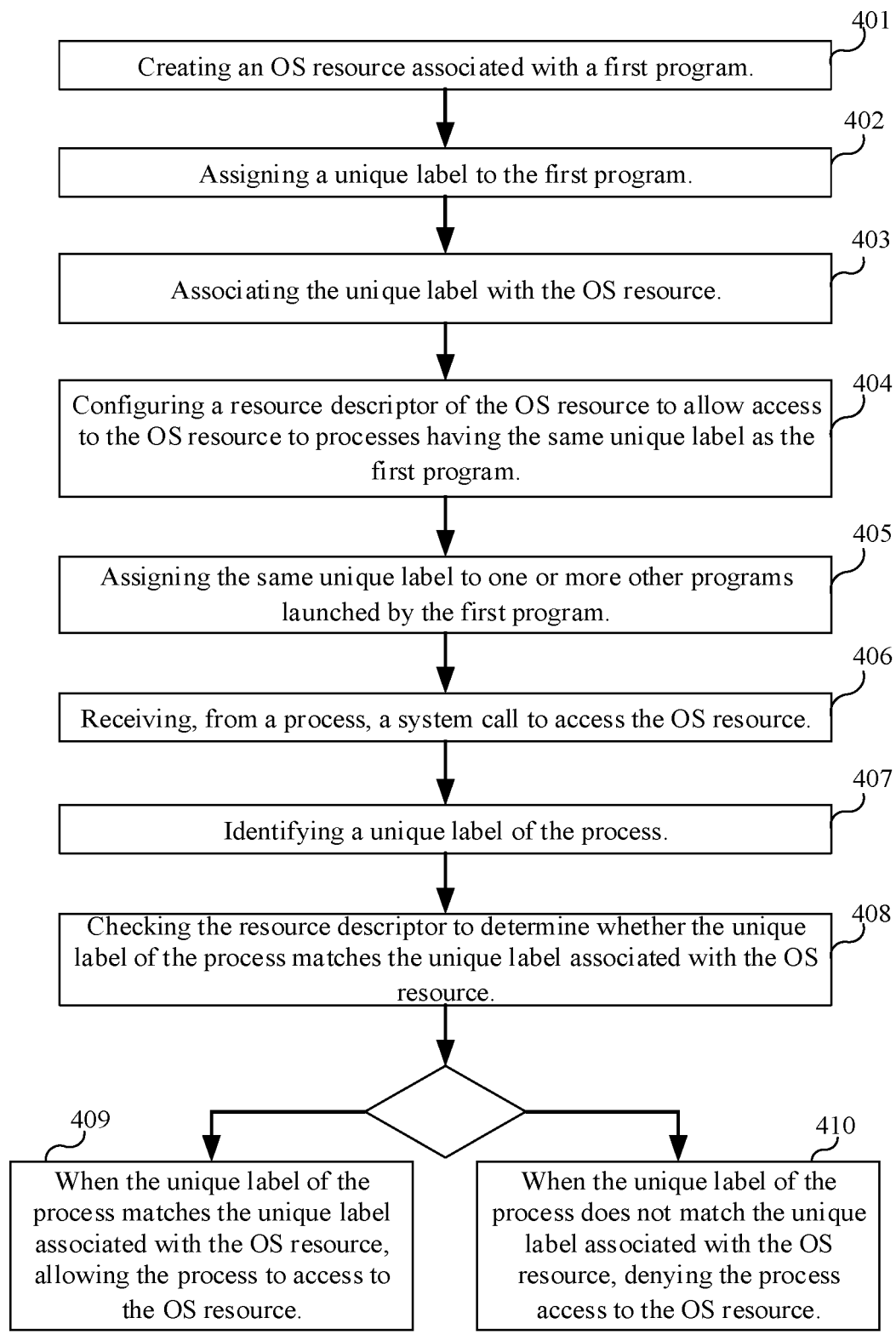
FIG. 4 is a flowchart illustrating general aspects of a method for controlling access to OS resources using dynamic process labeling.

FIG. 4 illustrates an exemplary method 400 for controlling access to computer resources using dynamic process labeling. A first step (401) of this general aspect comprises creating an OS resource associated with a first program. At step 402, a unique label is assigned to the first program. At step 403, the unique label is associated with the OS resource. At step 404, a resource descriptor of the OS resource is configured to allow access to the OS resource to processes having the same unique label as the first program, and to deny access to the OS resource to processes having different labels. At step 405, the same unique label is assigned to one or more child processes of other programs launched by the first program. At step 406, the method 400 includes a step of receiving, from a process, a system call to access the OS resource. At step 407, a unique label of the process is identified. At step 408, the method 400 includes a step of checking the resource descriptor to determine whether the unique label of the process matches the unique label associated with the OS resource. Based on this determination, at step 409, when the unique label of the process matches the unique label associated with the OS resource, the process is allowed to access to the OS resource. Alternatively, at step 410, when the unique label of the process does not match the unique label associated with the OS resource, the process is denied access to the OS resource.

Figure 5:
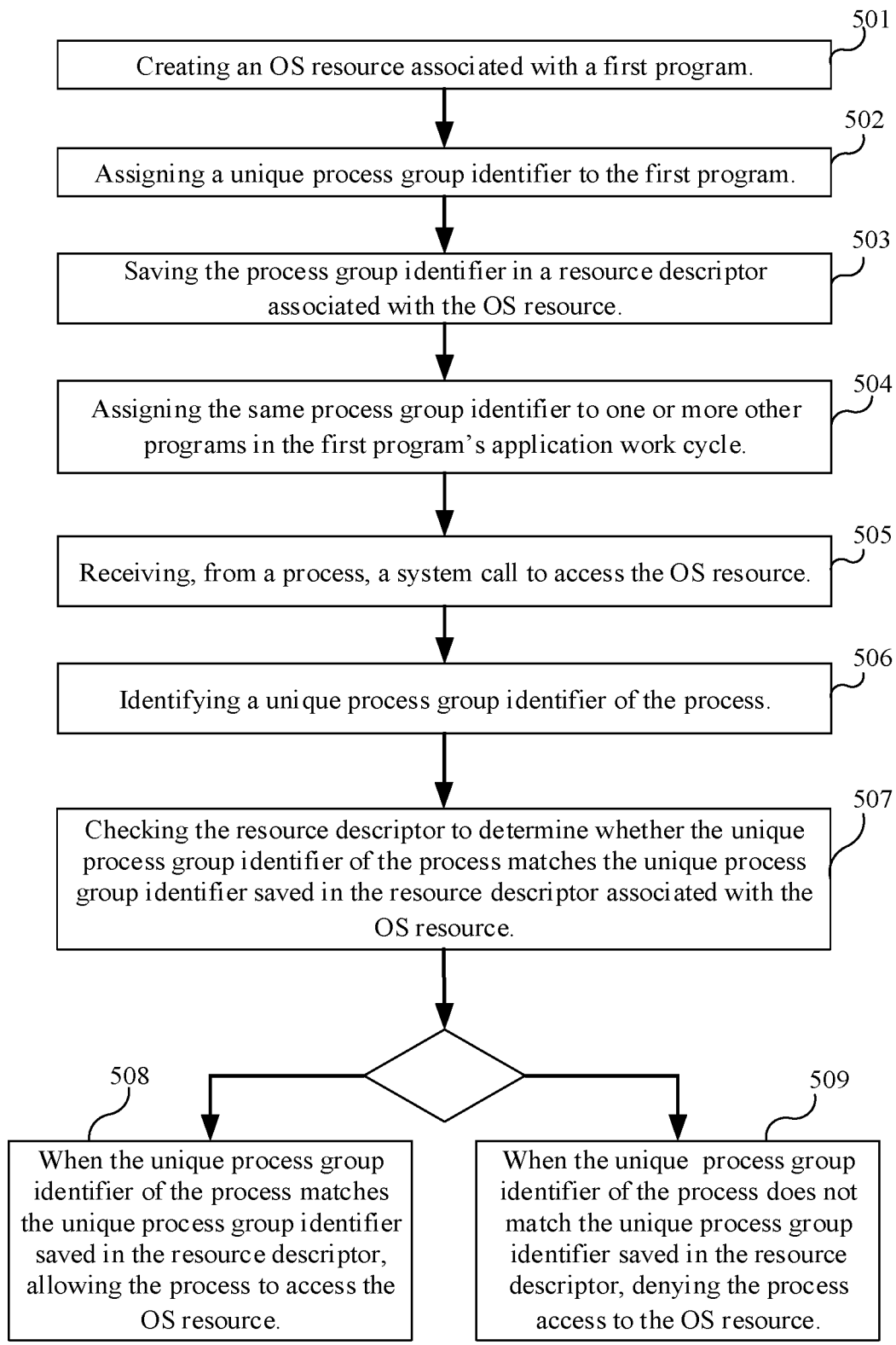
FIG. 5 is a flowchart illustrating general aspects of a method for controlling access to OS resources using process groups.

FIG. 5 illustrates an exemplary method 500 for controlling access to computer resources using process group labeling as an access control parameter for operating system resources. A first step (501) of this general aspect comprises creating an OS resource associated with a first program. At step 502, a unique process group identifier is assigned to the first program. At step 503, the unique process group identifier is saved in a resource descriptor associated with the OS resource. At step 504, the same process group identifier is assigned to one or more other programs in the first program's work cycle (e.g., a second program launched by the first program and child processes/threads of the second program launched by the first program). At step 505, the method 500 includes a step of receiving, from a process, a system call to access the OS resource. At step 506, a unique process group identifier of the process is identified. At step 507, the method 500 includes a step of checking in the resource descriptor to determine whether the unique process group identifier of the process matches the unique process group identifier saved in the resource descriptor associated with the OS resource. Based on this determination, at step 508, when the unique process group identifier of the process matches the unique process group identifier saved in the resource descriptor associated with the OS resource, the process is allowed to access to the OS resource. Alternatively, at step 509, when the unique process group identifier of the process does not match the unique process group identifier saved in the resource descriptor associated with the OS resource, the process is denied access to the OS resource. As noted above, the use of the same process group identifier for the processes of the first program and any child processes or threads of a second program launched by the first program allows the OS to differentiate between programs involved in the work cycle of the first program (e.g., processes of the second program launched by the first program) and other processes of the second program that were launched by other applications on the computer.

Figure 6:
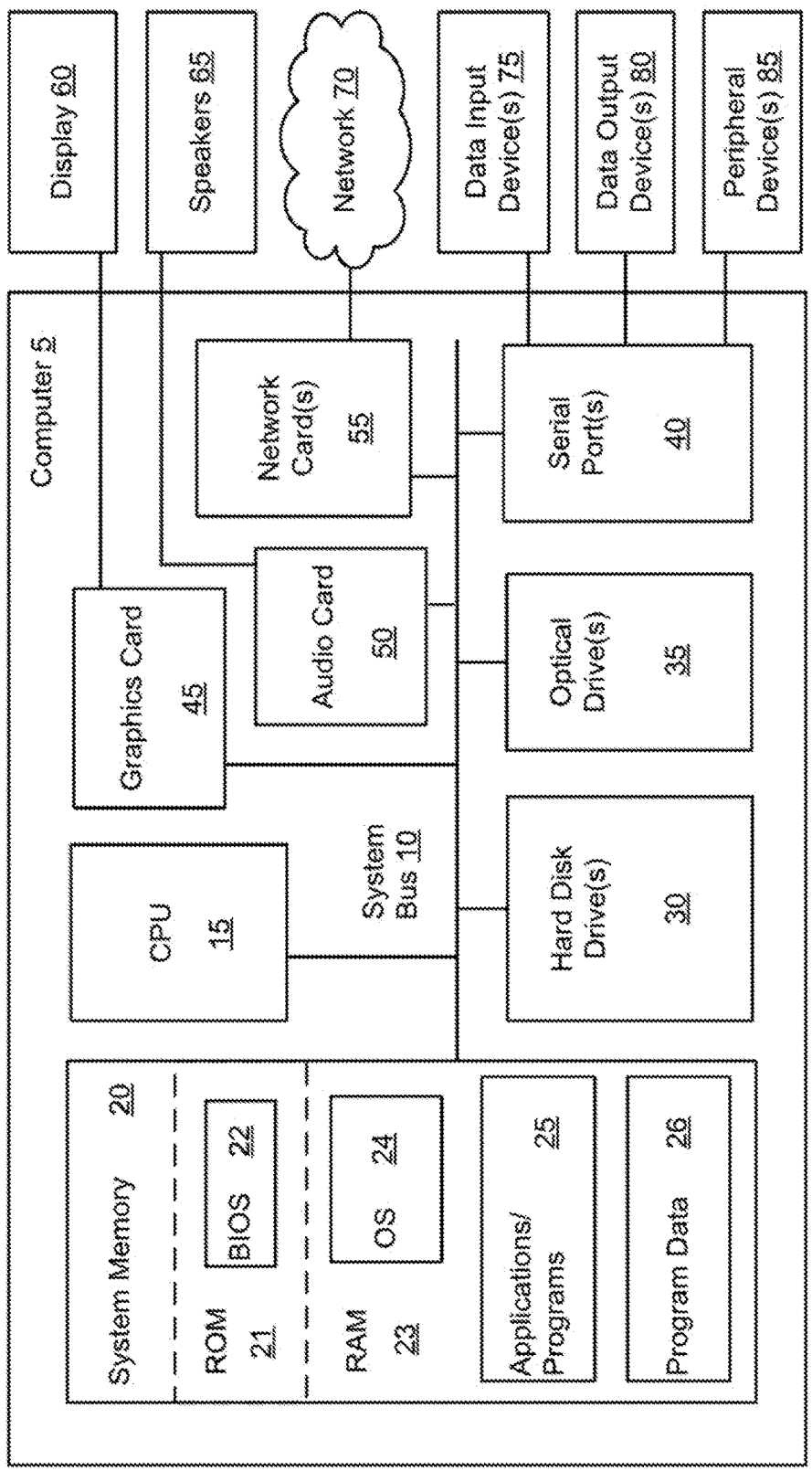
FIG. 6 is a diagram illustrating an example general-purpose computer system on which the systems and methods for controlling access to computer resources may be implemented.

FIG. 6 depicts an exemplary aspect of a computer system 5 that may be used to implement the disclosed systems and methods for controlling access to operating system resources. The computer system 5 may include, but is not limited to, a personal computer, a notebook, tablet computer, a smart phone, a mobile device, a network server, a router, or other type of processing device. As shown by this figure, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the modules of computer system 5, such as during start-up. RAM 23 stores operating system 24 (OS), such as Windows® 7 Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a display 60 or other video reproduction device, such as touch-screen display. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access to operating system (OS) resources, comprising:
   creating, by a hardware processor, an OS resource associated with a first program, wherein the OS resource comprises at least one of: a file handler associated with a file opened by the first program, a network socket associated with a network connection opened by the first program, a memory area used by the first program, and a portion of a block-level storage device used by the first program;
   assigning, by the hardware processor, a unique label to the first program, wherein the unique label is inherited by child processes launched by the first program; and
   assigning, by the hardware processor, the unique label to the OS resource, wherein the unique label is saved in a resource descriptor of the OS resource configured to allow access to the OS resource to processes having the same unique label as the first program, and to deny access to the OS resource to processes having a different label so as to prevent the processes having a different label from blocking the OS resource from being destroyed by the first program in response to termination of the first program, and wherein access to the OS resource comprises opening the OS resource by the first program, reading or writing the OS resource by at least one child process of the first program, and destroying the OS resource by the first program;

receiving, from a process, a system call to access the OS resource;

identifying, by the hardware processor, a unique label of the process; and checking, by the hardware processor, in the resource descriptor of the OS resource, whether the unique label of the process matches the unique label associated with the OS resource.

2. The method of claim 1, further comprising:

when the unique label of the process matches the unique label associated with the OS resource, allowing the process to access the OS resource; and when the unique label of the process does not match the unique label associated with the OS resource, denying the process access to the OS resource.

3. The method of claim 1, wherein the unique label is a process group identifier.

4. The method of claim 1, wherein the resource descriptor is accessed by an open( ) function configured to access a private data field of a block device driver.

5. The method of claim 1, further comprising:

receiving, from a system monitor daemon, a system call to access the OS resource subsequent to system calls from child processes of the first program;

responsive to determining that the system monitor daemon is not assigned a unique label that matches the unique label associated with the OS resource, denying access to the OS resource to the system monitor daemon; and destroying, by execution of the first program, the OS resource, wherein the system monitor daemon does not prevent termination of the OS resource.

6. A system for controlling access to operating system (OS) resources, comprising:

a hardware processor configured to:

create an OS resource associated with a first program, wherein the OS resource comprises at least one of: a file handler associated with a file opened by the first program, a network socket associated with a network connection opened by the first program, a memory area used by the first program, and a portion of a block-level storage device used by the first program;

assign a unique label to the first program, wherein the unique label is inherited by child processes launched by the first program; and assign the unique label to the OS resource, wherein the unique label is saved in a resource descriptor of the OS resource configured to allow access to the OS resource to processes having the same unique label as the first program, and to deny access to the OS resource to processes having a different label so as to prevent the processes having a different label from blocking the OS resource from being destroyed by the first program in response to termination of the first program, wherein access to the OS resource comprises opening the OS resource by the first program, reading or writing the OS resource by at least one child process of the first program, and destroying the OS resource by the first program;

receive from a process, a system call to access the OS resource;

identify a unique label of the process; and check in the resource descriptor of the OS resource, whether the unique label of the process matches the unique label associated with the OS resource.

7. The system of claim 6, wherein the hardware processor is further configured such that:

when the unique label of the process matches the unique label associated with the OS resource, allow the process to access the OS resource; and when the unique label of the process does not match the unique label associated with the OS resource, deny the process access to the OS resource.

8. The system of claim 6, wherein the unique label is a process group identifier.

9. The system of claim 6, wherein the resource descriptor is accessed by an open( ) function configured to access a private data field of a block device driver.

10. The system of claim 6, wherein the hardware processor is further configured to:

receive, from a system monitor daemon, a system call to access the OS resource subsequent to system calls from child processes of the first program;

responsive to determining that the system monitor daemon is not assigned a unique label that matches the unique label associated with the OS resource, deny access to the OS resource to the system monitor daemon; and destroy, by execution of the first program, the OS resource, wherein the system monitor daemon does not prevent termination of the OS resource.

11. A non-transitory computer readable medium storing computer-executable program instructions for controlling access to operating system (OS) resources, including instructions for:

creating an OS resource associated with a first program, wherein the OS resource comprises at least one of: a file handler associated with a file opened by the first program, a network socket associated with a network connection opened by the first program, a memory area used by the first program, and a portion of a block-level storage device used by the first program;

assigning a unique label to the first program, wherein the unique label is inherited by child processes launched by the first program; and assigning the unique label to the OS resource, wherein the unique label is saved in a resource descriptor of the OS resource configured to allow access to the OS resource to processes having the same unique label as the first program, and to deny access to the OS resource to processes having a different label so as to prevent the processes having a different label from blocking the OS resource from being destroyed by the first program in response to termination of the first program, wherein access to the OS resource comprises opening the OS resource by the first program, reading or writing the OS resource by at least one child process of the first program, and destroying the OS resource by the first program;

receiving, from a process, a system call to access the OS resource;

identifying a unique label of the process; and checking in the resource descriptor whether the unique label of the process matches the unique label associated with the OS resource.

12. The computer readable medium of claim 11, further comprising instructions for:
   when the unique label of the process matches the unique label associated with the OS resource, allowing the process to access the OS resource; and
   when the unique label of the process does not match the unique label associated with the OS resource, denying the process access to the OS resource.

13. The computer readable medium of claim 11, wherein the unique label is a process group identifier.

14. The computer readable medium of claim 11, wherein the resource descriptor is access by an open( ) function configured to access a private data field of a block device driver.

15. The computer readable medium of claim 11, further comprising instructions for:
   receiving, from a system monitor daemon, a system call to access the OS resource subsequent to system calls from child processes of the first program;
   responsive to determining that the system monitor daemon is not assigned a unique label that matches the unique label associated with the OS resource, denying access to the OS resource to the system monitor daemon; and
   destroying, by execution of the first program, the OS resource, wherein the system monitor daemon does not prevent termination of the OS resource.

\* \* \* \* \*